United States Patent [19]

Baird, Jr. et al.

[11] 3,917,670

[45] Nov. 4, 1975

[54] CARBONYLATION OF ORGANOMERCURIALS

[75] Inventors: William C. Baird, Jr., Westfield; Ronald L. Hartgerink, Edison; John H. Surridge, Scotch Plains, all of N.J.

[73] Assignee: Exxon Research & Engineering Company, Linden, N.J.

[22] Filed: Mar. 9, 1972

[21] Appl. No.: 233,338

[52] U.S. Cl.... 260/471 R; 260/326.2; 260/332.2 C; 260/347.4; 260/465 D; 260/468 M; 260/470; 260/475 R; 260/476 R; 260/486 AC; 260/488 R; 260/515 R; 260/515 P; 260/516; 260/518 R; 260/519; 260/533 B
[51] Int. Cl.².......................................... C07C 101/54
[58] Field of Search ........ 260/471 R, 475 R, 476 R, 260/486 AC, 518 R, 515 R, 515 P, 526 N, 526 R, 468 M, 488 L, 470, 476, 465 D, 519, 516, 533 B

[56] References Cited
OTHER PUBLICATIONS

Remy, H., Treatise on Inorganic Chemistry, (1956), Vol. II. Pub. by Elsevier Pub. Co. of N. Y. p. 476 cite.

*Primary Examiner*—Anton H. Sutto
*Assistant Examiner*—L. A. Thaxton
*Attorney, Agent, or Firm*—Joseph J. Allocca

[57] ABSTRACT

Carboxylic acids and carboxylic acid esters are prepared by the carbonylation of organomercurials in a solvent comprising either carboxylic acids or alcohols and in the presence of a Group VIII metal catalyst complex.

13 Claims, No Drawings

CARBONYLATION OF ORGANOMERCURIALS

This invention relates to the carbonylation of organomercurials. In one aspect it relates to the preparation of carboxylic acids by the carbonylation of organomercurials. In another aspect, it relates to the preparation of carboxylic acid esters by carbonylation in alcoholic media in the presence of Group VIII metal catalysts.

The reaction of organomercurials with carbon monoxide has been reported to occur through the insertion of carbon monoxide. Davidson et al. (*Chem. Commun.*, 126 (1966); *J. Chem. Soc.*, 1609 (1968); *J. Chem. Soc.*, 193 (1969) have studied this reaction in various hydroxylic solvents under conditions of high temperature and pressure. The reaction was nonselective and yielded product mixtures containing carboxylic acids, esters, keto esters, alcohols, and substituted alkanes. Fenton (U.S. Pat. No. 3,480,669, Nov. 25, 1969) reported the carbonylation of aryl mercurials in inert media. The reaction required high temperatures and pressures, long reaction periods, and provided low yields of product mixtures. Heck (*J. Amer. Chem. Soc.*, 90, 5546 (1968)) and Henry (*Tetrahedrom Lett.*, 2285 (1968); Brit. 1,164,561, Sept. 17, 1969)) utilized aryl mercurials as precursors to reactive organopalladium and organorohodium compounds by metal exchange with halide salts of these metals (eq. 1). Carbonylation of these organometallics under mild conditions gave in some cases mixtures of acids and esters, and in other mixtures of these compounds with ketones and coupled products (eq. 2).

$$- C-HgX + PdCl_2 \rightarrow - C - PdCl + HgXCl \quad (1)$$
$$- C-PdCl + CO \rightarrow Products + Pd \quad (2)$$

The reaction sequence produced a mercury (II) salt and palladium metal in stoichiometric amounts. If copper (II) chloride was added as an oxidizing agent to the acid/ester producing reactions, these reactions became catalytic in palladium. However, the conversion of organomercurial, even under these circumstances, did not exceed 50–60%.

It has now been found that certain Group VIII metal complexes effectively catalyze the carbonylation of carbon-mercury bonds under mild conditions to yield carboxylic acids or esters exclusively in high conversions. These reactions are qenuinely catalytic with respect to the Group VIII metal and no additional reagents are required to reactivate or to recycle the catalyst. Metallic mercury is produced as a byproduct in a form suitable for recycle according to the process described in Ser. No. 197,104, filed in Nov. 9, 1971, now U.S. Pat. No. 3,792,069.

The overall reaction for the conversion of organomercurials to acids or esters is illustrated by the following equation:

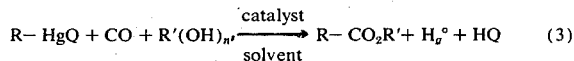

$$R-HgQ + CO + R'(OH)_{n'} \xrightarrow[\text{solvent}]{\text{catalyst}} R-CO_2R' + H_a° + HQ \quad (3)$$

The catalyst in the above equation is characterized by one of the following formulae:

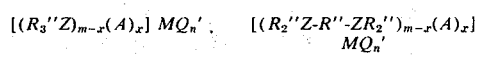

$$[(R_3''Z)_{m-x}(A)_x] MQ_n' \qquad [(R_2''Z-R''-ZR_2'')_{m-x}(A)_x] MQ_n'$$

$$\text{I} \qquad\qquad\qquad \text{II}$$

The radicals defined by R'' and attached to Z may be the same or different and are selected from the group consisting of $C_1$–$C_{12}$ linear and branched hydrocarbyl, $C_3$–$C_{12}$ cyclic alkyls, $C_2$–$C_{12}$ alkenyls and $C_2$–$C_{12}$ alkynyls; $C_1$–$C_{12}$ alkoxy, $C_6$–$C_{18}$ aryloxy and $C_6$–$C_{18}$ aryls. One or more substituents may be located in any position along the carbon skeleton and are selected from the group consisting of halide, hydroxide, carboxylate, carboxyl, carboalkoxyl, cyano, amino, acylamino, $C_1$–$C_6$ alkylamino, $C_6$–$C_{10}$ arylamino, nitro, sulfonate, carbonyl, $C_6$–$C_{10}$ aryl, $C_1$–$C_{12}$ alkoxyl, $C_6$–$C_{10}$ aryloxyl, acyl and aroyl. Z is either a metal or metal oxide and is one selected from the group consisting of phosphorus, arsenic, antimony and the pentavalent oxide of each. A is selected from the group carbonyl, nitrile, isonitrile, and amine. A preferred A is the carbonyl (CO) radical. M is a Group VIII metal; Q' is an anion; m is an integer ranging from 0 to 4; x is an integer ranging from 0 to 3; n is an integer ranging from 0 to 4 and the values of m and n are determined largely by the oxidation state of the Group VIII metal.

The various R'' groups which are complexed with the Z metal generate those ligands known as phosphines, phosphates, phosphites, arsines, arsenates, arsenites, stibines, stibites and stibates.

Specific examples of ligands useful in this invention are as follows: trimethylphosphine, triethylphosphine, tributylphosphine, tricyclohexylphosphine, tris(perfluoromethyl) phosphine, trivinylphosphine, triallylphosphine, triphenylphosphine, tritolylphosphine, trimethylphosphine, triethylphosphite, triphenylphosphite, tri-t-butylphosphite, tristyrylphosphine dimethylphenylphosphine, diphenylmethylphosphine, trimethylphosphate, tributylphosphate, triphenylphosphate, bis(diphenylphosphinoethane); bis(diphenylphosphinoethene); triphenylarsine, triphenylstibine, and bis(diphenylarsenoethane).

It is to be understood that the various R'' groups can be an integral part of a polymeric structure such as that attained by the polymerization of styrene monomers containing dialkyl, diaryl, or alkyl aryl phosphine substituents as herein defined above. These polymeric structures may also be derived from post-polymerization modification of polymers as described by Grubbs and Kroll, *J. Am. Chem. Soc.*, 93, 3062 (1971). It is also to be understood that catalysts represented by formulae I and II may be bonded to a solid support with the bonding, or anchoring, proceeding through one or more of the R'' groups as illustrated in the British Petroleum German Pat. Nos. 2,062,351; 2,062,352 and issued on June 24, 1971.

It is further understood that when $m = O$, the metal salts, $MQ_n$, may be supported on a conventional solid support. Representative supports are carbon, silica, alumina, resins and similar inert materials. The metal content of such supported catalysts may range from 0.1 to 50 weight percent.

It is also to be understood that the R'' groups can be attached to polymers attained by the polymerization of styrene monomers containing dialkyl, diaryl and diaryl alkyl phosphine substituents.

Although we have broadly stated that the Group VIII metals are useful in forming these catalyst complexes, we prefer to use the noble metals such as ruthenium, rhodium, palladium, osmium, iridium and platinum for the synthesis of the subject catalyst. The oxidation state of these metals ranges from 0 to +4.

Anions (Q') that are useful in this invention are illustrated by the following: hydride, chloride, bromide, iodide, perchlorate, sulfate, nitrate, nitrite, bisulfate, hydroxide, acetate, propionate, butyrate, pivalate, benzoate, chloroacetate, trichloroacetate, trifluoroacetate, methylsulfonate, phenylsulfonate, trifluoromethylsulfonate, acetyl acetonate, carboxylate, halcarboxylate, alkylsulfate and sulfonate, haloalkylsulfonate, sulfonic acid resin salt, betadiketone, beta-disulfone, beta-disulfoxide Specific catalysts useful in this invention are as follows: tris(triphenylphosphine)chlororhodium (I); tris(triphenylphosphine)chlororuthenium (I); tris)triphenylphosphine) hydridodichlororuthenium (II); tetrakis(triphenylphosphine)palladium (O); tetrakis(triphenylphosphine)platinum (O); bis(triphenylphosphine)dichloropalladium (II); bis(triphenylphosphine)dichloroplatinum (II); bis(triphenylphosphine)-chlorocarbonyliridium (I); di[1,2-bis(diphenylphosphinoethane] dichloroosmium (II).

The organomercury compounds that can be converted to either carboxylic acids or esters by the subject process are characterized by the formula: R—(HgQ)$_z$ where R is one selected from the group consisting of $C_1$–$C_{30}$ linear, branched and cyclic alkyls, alkenyls, and alkynyls; and $C_6$–$C_{18}$ aryls. One or more substituents may be located in any position of the carbon skeleton and are selected from the group consisting of halide, hydroxide, carboxylate, carboxyl, carboalkoxyl, cyano, amino, acylamino, alkylamino, arylamino, nitro, sulfonate, carbonyl, aryl, alkoxyl, aryloxyl, acyl, aroyl, nitrate, hydrosulfide, alkylsulfide, arylsulfide and azide. Q is an anion selected from the group consisting of chloride, bromide, iodide, perchlorate, nitrate, sulfate, bisulfate, hydroxide, alkoxide, aryloxide, acetate, propionate, butyrate, pivalate, neohexanoate, benzoate, chloroacetate, trichloroacetate, trifluoroacetate, methyl sulfonate, phenyl sulfonate, trifluoromethyl sulfonate. Preferred anions are selected from among the several carboxylate anions.

One or more —HgQ radicals may be attached to any carbon atom of the above-described organic group R to generate any of the several classes of organomercurials.

When —HgQ is attached directly to an aromatic ring, aryl mercury salts result and these are not restricted to benzene and its derivatives, but include as well, polynuclear aromatics such as naphthalene, anthracene, phenanthrene, which may carry the substituents described above.

Aromatic nuclei present in polymeric systems which are capable of mercuration are also included under the designation of R, polystyrene is an example of such a material.

Heterocyclics such as thiophene, furan, pyrollidine, benzothiophene, dibenzothiophene, benzofuran and their derivatives are also able to be converted to acids or esters via their mercuration under the process of this invention.

Another class of mercurials that can be supplied to this reaction are those derived from metallocenes and substituted metallocenes bearing substituents as defined above in the description of R. Metallocenes of interest include ferrocene, cobalticene, cymantrene, dibenzchromium and related organometallics.

Specific examples of those organomercuric compounds represented by R—(HgQ)$_z$ include methylmercuric chloride; ethylmercuric acetate; propylmercuric bromide; cyclohexylmercuric chloride; isopropylmercuric iodide; tertiary butylmercuric chloride; dodecylmercuric propionate; hexadecylmercuric nitrate; eicosylmercuric perchlorate; β-phenylethylmercuric pivalate; 3-chloropropylmercuric trifluoroacetate; 5-hydroxypentylmercuric acetate; 4-acetoxybutylmercuric chloride; 3-ketohexylmercuric trifluoromethanesulfonate; 8-methoxydecylmercuric butyrate; 1-acetoxymercuri-2-acetoxyethane; 1-bromomercuri-2-methoxyhexane; 1-chloromercuri-2-acetamidobutane; 1-iodomercuri-2-t-butoxycyclohexane; 1-isopropoxy-1-phenyl-2-trifluoroacetoxymercuriethane; 1-chloromercuri-2,3-dichloropropane; 1,4-diacetoxymercuri-2,3-diacetoxybutane; 1,2-dihydroxy-3-acetoxymercuributane; 1-methoxy-2-bromomercuri-3-ketobutane; 2-cyano-2-ethoxyethylmercuric pivalate; 2,5-dimethoxypentylmercuric nitrate; alkylmercuric chloride; 3-methoryallylmercuric hydroxide; crotylmercuric iodide; trans-1-acetoxymercuri-4-acetoxybutene-2; 3-cyclohexenylmercuric bromide; isopropenylmercuric chloride; 2,2-diphenylvinylmercuric nitrate; 2-phenyl-3-trifluoroacetoxymercuric norbornene-2; trans-2-chlorovinylmercuric chloride; 1,2,2-trichlorovinylmercuric propionate; phenylmercuric trifluoroacetate; 4-isopropylphenylmercuric ethoxide; 4-hydroxyphenylmercuric acetate; 2,4,5-trimethylphenylmercuric pivalate; 4,4'-bis(acetoxymercuri)-biphenyl; 3-carbomethoxyphenylmercuric chloride; 4-chlorophenylmercuric perchlorate; 4-ethoxyphenylmercuric bromide; 1,4-acetoxymercuri-2,5-dimethylbenzene; 2-naphthylmercuric butyrate; 1,4-dicarbomethoxy-2-trifluoroacetoxymercuribenzene; acetoxymercuriresorcinol; 1-amino-2,4-diacetoxymercurinaphthalene; 3-chloro-2-methoxyphenylmercuric nitrate; 5-chloro-2-hydroxyphenylmercuric trifluoromethanesulfonate; 4-hydroxymercuri-2-nitrophenol; chloromercuriferrocene; dichloromercuriferrocene; acetoxymercuripolystyrene; 2-chloromercuripyrolle; 2,5-dichloromercurithiophene and acetoxymercuricyclopentadienylmanganese tricarbonyl.

The more preferred organomercuric compounds are set out in the following table with the product that results from using them as the starting material.

| RHgQ | Product |
| --- | --- |
| Vinylmercuric acetate | Methyl acrylate |
| Trifluoroacetoxymercuri-carbomethoxybenzene | Dimethyl phthalates |
| 4,4'-Bis(trifluoroacetoxymercuri) biphenyl | 4,4'-Biphenyldicarboxylic acid, dimethyl ester |
| Trifluoroacetoxymercuri-p-xylene | 2,5-Xylic acid, methyl ester |
| Acetoxymercuri aniline | Ethyl aminobenzoates |
| Acetoxymercuri pseudocumene | Methyl durilate |
| Acetoxymercuri polystyrene | Carbomethoxy polystyrene |

-continued

| RHgQ | Product |
|---|---|
| Trifluroacetoxymercuri dimethyl terephthalate | Trimethyl trimellitate |
| 2,3-Bis(acetoxymercuri) naphthalene | 2,3-Naphthalene dicarboxylic acid, dimethyl ester |
| 4-(acetoxymercuri)-1,2-dimethyl benzene | 3,4-Xylic acid, methyl ester |
| 4-(acetoxymercuri)-1,3-dimethyl benzene | 2,4-Xylic acid, methyl ester |
| 4,5-Bis(acetoxymercuri)-1,2-dimethyl benzene | 4,5-dimethyl phthalic acid, dimethyl ester |
| 4,6-Bis(trifluoroacetoxymercuri)-1,3-dimethyl benzene | 4,6-dimethyl isophthalic acid, dimethyl ester |

Procedures for preparing organomercurials are found in (a) F. Whitmore, "Organic Compounds of Mercury", The Chemical Catalog Co., New York, N.Y., 1921; (b) N. Hagihara, M. Kumada and R. Okawara, "Handbook of Organometallic Compounds", W. A. Benjamin, Inc., New York, N.Y., 1968; (c) J. Chatt, *Chemical Reviews*, 1951.

A variety of alcohols may be utilized in this invention. Suitable alcohols are primary, secondary, and tertiary $C_1$–$C_{30}$ aliphatic and cycloaliphatic alcohols, $C_3$–$C_{20}$ unsaturated alcohols, $C_6$–$C_{20}$ hydroxy aromatics, $C_2$–$C_{20}$ glycols, triols and higher polyols.

Examples of these hydroxy compounds are methyl alcohol, ethyl alcohol, propyl alcohol, isopropyl alcohol, tertiary butyl alcohol, neohexyl alcohol, cyclohexanol, n-octanol, 2-ethylhexanol, dodecyl alcohol, behenyl alcohol, cyclopentanol, cyclooctanol, cyclododecanol, allyl alcohol, crotyl alcohol, cyclohexen-3-ol, phenol, resorcinol, hydroquinone, 4,4'-dihydroxybiphenyl, ethylene glycol, propylene glycol, 1,3-propanediol, 1,4-butanediol, 1,6-hexanidiol, 1,4-butene-2-diol, glycerol.

In the event that the organomercurial compound is to be converted to its carboxylic acid rather than its ester, then the alcoholic reactant illustrated and enumerated hereinabove is substituted by a low molecular weight carboxylic acid. Useful acids for the purpose are $C_2$–$C_{10}$ carboxylic acids such as acetic, propionic, butyric, pivalic, neohexanoic, neodecanoic, chloroacetic, trichloroacetic, trifluoroacetic and benzoic acids.

While ordinarily an alcohol or a carboxylic acid will serve as the reaction medium, it may be desirable to employ a cosolvent. The cosolvent may be required to dissolve a difficulty soluble organomercurial or to provide a liquid medium if the reacting alcohol or acid is a solid at reaction conditions. The cosolvent is added to the carboxylation reaction and is selected from among the following compounds: $C_5$–$C_{20}$ alkanes such as pentane, isooctane, cycloheptane, dodecane; $C_6$–$C_{12}$ aromatic hydrocarbons such as benzene, toluene, xylenes, mesitylene; ethers such as tetrahydrofuran, diglyme, dimethoxyethane; halocarbons such as methylene chloride, chloroform, carbon tetrachloride, freons, fluorocarbons; ketones such as acetone, methyl ethyl ketone, cyclopentanone, cyclohexanone, acetophenone; esters such as methyl acetate, ethyl acetate, butyl acetate, ethyl propionate, amyl butyrate; nitro compounds such as nitromethane, nitroethane, nitropropane, nitrobenzene; nitriles such as acetonitrile, propionitrile, benzonitrile, acrylonitrile; carbonates such as ethylene carbonate, propylene carbonate; sulfoxides such as dimethyl sulfoxide; sulfones such as sulfolene and sulfolane.

The reaction temperatures range from 0° to 500°C. preferably from 20° to 200°C.

The pressures range from 1 to 1,000 atmospheres, preferably from 2 to 30 atmospheres. The partial pressure of CO ranges from 0.01 0.1 to 1,000 atmospheres, preferably 0.1–50 atmospheres.

The reactants can be charged in any order and the reaction catalysts can either be preformed or generated in situ by the separate addition of the individual catalyst components in any proportion.

It is also to be understood that the process can be operated in either a continuous, semi-continuous or a batch operation.

The mole ratios of the reactants are not critical; however, it is preferable to maintain molar excesses of carbon monoxide and either the alcohol or carboxylic acid relative to the moles of organomercurial compound particularly when the latter materials serve as the reaction medium.

The mole ratios range from 1 mole of carbon monoxide to 1,000 moles per mole of mercurial compound and preferably from 2 to 200 mole per mole of mercurial compound.

The amount of alcohol or carboxylic acid also ranges from 1 to 1,000 moles of either alcohol or acid per mole of mercurial compound and preferably from 2 to 200 moles of either the alcohol or the acid per mole of mercurial compound.

The amount of catalyst charged to the reaction is also not critical and ranges from 1 to 50,000 moles of mercurial compound per mole of catalyst preferably from 10 to 10,000 moles per mole of catalyst. The stoichiometric amounts of the organomercurial compound as well as carbon monoxide to either the alcohol or the acid are independent of the presence or absence of a cosolvent. When a cosolvent is employed, it may be present in the reaction medium in the amount of 1 to 500 volume percent relative to the alcohol or carboxylic acid ester.

The purity of the reactants is not critical, and the reaction does not require anhydrous conditions. Carbon monoxide can be supplied as pure carbon monoxide, as synthesis gas mixed with hydrogen, or as steam cracker gas mixed with hydrogen and carbon dioxide.

The carboxylic acids and esters produced by this reaction enjoy a variety or uses in the chemicals business. Predominant among these are such applications as plasticizers, polymers, pharmaceuticals, dyes, additives and detergents.

Some illustrative examples representing the conversion of specific feeds to valuable products are: ethylene to methyl acrylate; ethyl benzene to vinyl benzoic acid (carboxylation and dehydrogenation); polystyrene to carboxypolystyrene; methyl benzoate to dioctyl phthalate; dimethyl terephthalate to trimethyl trimetllitate; o-, m-, and p-xylene to trimellitic anhydride (carboxylation and oxidation); o- and m-xylenes to pyromellitic dianhydride (dicarboxylation and oxidation); pseudocumene to pyromellitic dianhydride (carboxylation and oxidation); chlorobenzene to p-chlorobenzoic acid; anisole to p-anisic acid; aniline to p-aminobenzoic acid or to benzocaine; phenol to p-hydroxybenzoid acid or to salicylic acid; durene to tetramethyl dimethyl terephthalate; biphenyl to 4,4'-dicarboxybiphenyl; naphthalene to 2,3-naphthalene dicarboxylic acid; 2-methylnaphthalene to 3-methyl-2-naphthoic acid.

The following examples will illustrate the principles of the inventive concept expressed therein:

EXAMPLE 1

Into a 45 ml. Parr stainless-steel reactor was charged 0.289 g. (1.0 mmole) of ethylmercuric acetate, 0.020 g. (0.020 mmole) tris(triphenylphosphine)chlororhodium (I), 10 ml. of methanol and a small magnetic stirrer. The bomb was closed, purged with CO, and then pressurized with CO to 500 psig. The bomb was then suspended in an oil bath at 100°C. and stirred magnetically. After 24 hours the bomb was cooled in ice, opened and its contents analyzed. Methyl propionate was identified by vpc and nmr comparison with authentic material and was found to be present in a 66% yield based on starting ethylmercuric acetate. A 75% yield of mercury metal was obtained and thiocyanate titration of the reaction mixture indicated 25% remaining ethylmercuric acetate.

EXAMPLES 2–11

In examples 2–11 (see Table 1), the procedure of example 1 was used.

EXAMPLE 12

Examples 12 and 13 illustrate the effectiveness of this invention in producing aromatic esters from aromatic mercurials. In a 500 ml. glass bomb fitted with a teflon pressure valve were placed 7.8 g. (20 mmole) phenylmercuric trifluoroacetate, 100 ml. methanol, and 0.14 g. (0.2 mmole) bis(triphenylphosphine)dichloropalladium (II). The bomb pressure was reduced to approximately 25 mm. and then carbon monoxide was added to a pressure of 60 psig. The reaction mixture was shaken and heated at 90°C. for 1.5 hr. At the end of this period the bomb contained a clear, colorless solution over a small pool of metallic mercury. By gas chromatographic analysis the methanol phase contained a 78% yield of methyl benzoate. The mercury was collected by filtration, weight 3.76 g. (94%).

TABLE I

| Example | Mercurial (g.) | Feed (mmole) | Alcohol/Solvent(ml) | Catalyst (g.) | (mmole) | CO pressure (psig) | Time (hr.) | Temp. (°C) |
|---|---|---|---|---|---|---|---|---|
| 2 | n-Hexylmercuric acetate (5.16) | (15.0) | CH$_3$OH (250) | Tris(triphennylphosphine)-chlororhodium (I) (0.10) | (0.10) | 910 | 6 | 63 |
| 3 | n-Dodecylmercuric acetate (10.75) | (25.1) | CH$_3$OH (70) Tetrahydrofuran (130) | Tris(triphenylphosphine)-chlorohodium (I) (0.525) | (0.57) | 500 | 40 | 100 |
| 4 | Vinylmercuric acetate (0.287) | (1.0) | CH$_3$OH (10) | Bis(triphenylphosphine)dichloropalladium (II) (0.007) | (0.01) | 200 | ½ | 75 |
| 5 | Isopropenylmercuric acetate (1.4) | (5.0) | CH$_3$OH (10) | Bis(triphenylphosphine)dichloropalladium (0.035) | (0.05) | 200 | ½ | 75 |
| 6 | 2,2-Diphenylvinyl-mercuric acetate (4.39) | (10.0) | CH$_3$OH (70) Acetone (70) | Bis(triphenylphosphine)dichloropalladium (0.070) | (0.10) | 500 | 3 | 75 |
| 7 | Allylmercuric acetate (2.0) | (6.7) | CH$_3$OH (20) | Tris(triphenylphosphine)chlororhodium (I) (0.030) | (0.03) | 500 | 1 | 100 |
| 8 | 1-Acetoxymercuri-2-methoxyhexane (5.61) | (15.0) | CH$_3$OH (250) | Tris(triphenylphosphine)-chlororhodium (I) (0.10) | (0.10) | 50 | 21 | 100 |
| 9 | 1-Acetoxymercuri-2-methoxycyclohexane (5.58) | (15.0) | CH$_3$OH (250) | Tris(triphenylphosphine)-chlororhodium (I) (0.10) | (0.10) | 60 | 20 | 75 |
| 10 | 1-Acetoxymercuri-2-acetoxyethane (5.19) | (15.0) | CH$_3$OH (250) | Tris(triphenylphosphine)-chlororhodium (I) (0.10) | (0.10) | 75 | 21 | 100 |
| 11 | 2[methoxyphenyl]-ethylmercuric iodide (6.93) | (15.0) | CH$_3$OH (250) | Tris(triphenylphosphine-chlororhodium (I) (0.10) | (0.10) | 1000 | 24 | 100 |

| Example | Product(s) | Yield (%) |
|---|---|---|
| 2 | Methyl heptanoate | 63 |
| 3 | Methyl tridecanoate | 48 |
| 4 | Methyl acrylate | 74 |
| 5 | Methyl methacrylate | 31 |
| 6 | Methyl 2,2-diphenyl-acrylate | 36 |
| 7 | Methyl-3-butenoate | 35 |
| 8 | Methyl β-methoxy-heptanoate | 28 |
| 9 | 1-Carbonmethoxy-2-methoxycyclohexane | 21 |
| 10 | Methylβ-acetoxy-propanoate | 31 |
| 11 | Methyl 3-[methoxyphenyl]-propanoate | 44 |

EXAMPLE 13

To a 1000 ml. capacity Parr series 4500 pressure reactor was charged 250 ml. methanol, 29.2 g. (74 mmole) phenylmercuric trifluoroacetate, and 0.007 g. (0.01 mmole) bis(triphenylphosphine)dichloropalladium(II). After removal of air from the reactor via water aspirator evacuation, the vessel was pressured to 90 psig with carbon monoxide. The reaction contents were stirred at 400 rpm for 1.75 hr. at 85°–90°C. Gas chromatographic analysis of the cooled reaction mixture indicated a 68% yield of methyl benzoate. Filtration of the reaction mixture gave a 75% yield of metallic mercury.

EXAMPLES 14–29

Examples 14 to 29 (see Table II) illustrate this invention with respect to the variety of aryl mercurials which may be employed as substrates. In general, the procedure of example 13 was used. Products were identified by comparison of their chromatograms, spectra and physical constants with authenic samples.

EXAMPLE 30

Piccolastic D-125 polystyrene was treated with mercuric trifluoroacetate in trifluoroacetic acid giving a mercurated crystalline polymer.

Employing essentially the same method as in example 13, 12.5 g. (20 meq. based on titration) of the mercurated polystyrene, 50 ml. methanol, 0.15 g. (0.21 mmole) bis(triphenylphosphine)dichloropalladium (II), and 250 ml. dichloromethane as a cosolvent were charged to a 1000 ml. stainless steel bomb. Under an initial carbon monoxide pressure of 90 psig, the reaction mixture was stirred at 75°–100°C. for 1 hr. and was then cooled to ambient temperature. Filtration of the reaction mixture produced 6.0 g. of mercury metal. The filtrate was evaporated to a solid residue which was washed with refluxing methanol. The methanol insoluble material was collected by filtration and then dried at 60°C. (150 mm) giving 3.8 g. of a crystalline product. Infrared and NMR spectrometric analysis indicated the incorporation of 20–25% methyl ester groups based on aromatic rings.

TABLE II

| Example | Aryl Mercurial Feed (g.) (mmole) | Alcohol/ Solvent (ml.) | Catalyst (g.) (mmole) | CO Pressure psig | Time (hr.) | Temp. (°C) | Product(s) | Yield (%) |
|---|---|---|---|---|---|---|---|---|
| 14 | Trifluoroacetoxy mercuri-chlorobenzene (12.8) (30) | CH₃OH (150) | Bis(triphenylphosphine)- dichloropalladium (II) (0.15) (0.21) | 90 | 1.0 | 75 | Methyl chloro- benzoates | 75 |
| 15 | Acetoxymercurianisole (5.5) (15) | CH₃OH (175) | Bis(triphenylphosphine)- dichloropalladium (II) (0.105) (0.15) | 100 | 0.3 | 60 | Methyl anisates | 70 |
| 16 | Trifluoractoxymercuri- carbomethoxybenzene (9.8) (21.8) | CH₃OH (150) | Bis(triphenylphosphine)- dichloropalladium (II) (0.15) (0.21) | 90 | 1.0 | 75 | Dimethyl phthalates | 68 |
| 17 | 4,4'-Bis(trifluoroace- toxymercuri) biphenyl (20.3) (26) | CH₃OH (200) Tetrahydrofuran (100) | Bis(triphenylphosphine)- dichloropalladium (II) (0.10) (0.14) | 128 | 3.0 | 95 | 4,4'-Biphenyl- dicarboxylic acid, dimethyl ester | 67 |
| 18 | Trifluoroacetoxymercuri- toluene (12.7) (30) | CH₃OH (200) | Bis(triphenylphosphine)- dichloropalladium (II) (0.10) (0.14) | 70 | 1.0 | 90 | Methyl Toluates | 88 |
| 19 | Trifluoroacetoxymercuri- ethylbenzene (11.1) (26.5) | CH₃OH (200) | Bis(triphenylphosphine)- dichloropalladium (II) (0.10) (0.14) | 70 | 1.0 | 80 | Methyl ethyl- benzoates | 99 |
| 20 | Trifluoroacetoxymercuri- t-butylbenzene (15.9) (28.5) | CH₃OH (200) | Bis(triphenylphosphine)- dichloropalladium (II) (0.10) (0.14) | 70 | 1.0 | 90 | Methyl t-butyl- benzoates | 75 |
| 21 | Trifluoroacetoxymercuri- p-xylene (15.3) (36.6) | CH₃OH (200) | Bis(triphenylphosphine)- dichloropalladium (II) (0.10) (0.14) | 70 | 1.0 | 90 | 2,5-Xylic Acid methyl ester | 84 |
| 22 | Acetoxymercurianiline (8.2) (20.0) | C₂H₅OH (150) | Bis(triphenylphosphine)- dichloropalladium (II) (0.15) (0.21) | 90 | 1.0 | 80 | Ethyl aminoben- zoates | 10 |
| 23 | Acetoxymercuripseudo- cumene (5.7) (15) | CH₃OH (150) | Bis(triphenylphosphine)- dichloropalladium (II) (0.10) (0.14) | 100 | 1.0 | 70 | Methyl durilate | 69 |
| 24 | Trifluoroacetoxynaph- thalene (16.0) (28.1) | CH₃OH (200) | Bis(triphenylphosphine)- dichloropalladium (II) (0.10) (0.14) | 70 | 0.9 | 70 | Methyl naphth- oates | 60 |
| 25 | Acetoxymercuri-m-xylene (12.3) (29.4) | CH₃OH (200) | Bis(triphenylphosphine)- dichloropalladium (II) (0.10) (0.14) | 100 | 1.0 | 85 | 2,4-Xylic Acid, methyl ester | 64 |
| 26 | Acetoxymercuri-o-xylene (3.65) (10.0) | CH₃OH (150) | Bis(triphenylphosphine)- dichloropalladium (II) (0.07) (0.10) | 100 | 2.0 | 75 | 3,4-Xylic Acid, methyl ester | 85 |
| 27 | Trifluoroacetoxymercuri- dimethyl terephthalate (5.06) (10.0) | CH₃OH (100) Tetrahydro- furan (100) | Bis(triphenylphosphine)- dichloropalladium (II) (0.14) (0.2) | 100 | 3.0 | 110 | Trimethyl tri- mellitate | 30 |
| 28 | 4,5-Bis(trifluoroacetoxy- mercuri)-1,2-dimethylben- zene (8.8) (12.0) | CH₃OH (200) | Bis(triphenylphosphine)- dichloropalladium (II) (0.17) (0.24) | 100 | 1.2 | 85 | 4,5-Dimethyl phthalic acid, dimethyl ester | 67 |
| 29 | 4,6-Bis(trifluoroacetoxy- mercuri(-1,3-dimethylben- zene (11.0) (15.0) | CH₃OH (200) | Bis(triphenylphosphine)- dichloropalladium (II) (0.21) (0.30) | 100 | 1.0 | 80 | 4,6-Dimethyl isophthalic acid, dimethyl ester | 30 |

EXAMPLES 31–34

Examples 31 to 34 in Table III and example 11 in Table I are illustrative of the anion which may be a part of the mercurial used in these reactions. Essentially the procedure of example 1 or example 13 was used.

EXAMPLE 35

Utilizing the procedure of example 1, 0.49 g. (1.25 mmoles) of phenylmercuric trifluoroacetate, 0.009 g. (0.012 mmole) of bis(triphenylphosphine)dichloropalladium (II) and 10 ml. of methanol was reacted with a mixture of carbon monoxide (200 psig) and carbon dioxide (50 psig) at 75°C. for one-half hour to give a 66% yield of methyl benzoate based on starting mercurial.

EXAMPLE 36

Example 35 was repeated except that the gas was a mixture of carbon monoxide (100 psig), hydrogen (100 psig), and carbon dioxide (50 psig). The yield of methyl benzoate was 66% based on starting mercurial.

EXAMPLES 37–49

Examples 37–49 in Table IV are illustrative of the catalyst which may be used in these reactions and include compositions of various metals, metal oxidation states, and ligands. Essentially the procedure of either example 1 or example 13 was used in each case.

TABLE III

| Example | Murcurial (g.) | Feed (mmole) | Alcohol/ Solvent (ml) | Catalyst (g.) (mmole) | CO pressure (psig) | Time (hr.) | Temp. (°C) | Product(s) | Yield (%) |
|---|---|---|---|---|---|---|---|---|---|
| 31 | n-Hexylmercuric bromide (5.84) | (15.0) | CH$_3$OH (250) | Tris(triphenylphosphine)-chlororhodium (I) (0.10) (0.10) | 70 | 72 | 75 | Methyl heptanoate | 72 |
| 32 | Pivaloxymercuri-mesitylene (5.05) | (12.0) | CH$_3$OH (150) | Bis(triphenylphosphine)-dichloropalladium (II) (0.084) (0.12) | 100 | 5.0 | 75 | Methyl β-isodurilate | 20 |
| 33 | Phenylmercuric nitrate (0.425) | (1.25) | CH$_3$OH (10) Tetrahydrofuran (10) | Bis(triphenylphosphine)-dichloropalladium (II) (0.009) (0.012) | 100 | ½ | 75 | Methyl benzoate | 56 |
| 34 | Phenylmercuric chloride (0.392) | (1.25) | CH$_3$OH (10) Tetrahydrofuran (10) | Bis(triphenylphosphine)-dichloropalladium (II) (0.009) (0.012) | 100 | ½ | 150 | Methyl benzoate | 26 |

TABLE IV

| Example | Mercurial Feed (g.) (mmole) | Alcohol/ Solvent (ml.) | Catalyst (g.) (mmole) | CO Pressure psig | Time (hr.) | Temp. (°C) | Product(s) | Yield (%) |
|---|---|---|---|---|---|---|---|---|
| 37 | Phenylmercuric trifluoroacetate (1.95) (5.0) | CH$_3$OH (20) | Palladium (0.005) (0.05) Triphenylphosphine (0.026) (0.10) | 500 | 1 | 100 | Methyl benzoate | 23 |
| 38 | Phenylmercuric nitrate (0.425) (1.25) | CH$_3$OH (10) Tetrahydrofuran (10) | Palladium nitrate (0.0028) (0.012) | 100 | 1 | 75 | Methyl benzoate | 12 |
| 39 | Phenylmercuric trifluoroacetate (1.56) (4.0) | CH$_3$OH (20) | Disodium tetrachloropalladate (0.012) (0.04) | 100 | ½ | 75 | Methyl benzoate | 7 |
| 40 | Phenylmercuric trifluoroacetate (1.95) (5.0) | CH$_3$OH (20) | Palladium chloride (0.018) (0.10) | 200 | ½ | 75 | Methyl benzoate | 24 |
| 41 | Phenylmercuric trifluoroacetate (1.95) (5.0) | CH$_3$OH (20) | Palladium chloride (0.018) (0.10) Triphenylphosphine (0.026) (0.10) | 200 | ½ | 75 | Methyl benzoate | 72 |
| 42 | Phenylmercuric nitrate (0.425) (1.25) | CH$_3$OH (10) Tetrahydrofuran (10) | Bis(tri-n-butylphosphine dichloropalladium (II) (0.007) (0.012) | 100 | ½ | 75 | Methyl benzoate | 69 |
| 43 | Phenylmercuric trifluoroacetate (1.95) (5.0) | CH$_3$OH (20) | Palladium dichloride (0.018) (0.10) Bis(1,2-diphenylphosphine)-ethane (0.040) (0.10) | 200 | 5/6 | 75 | Methyl benzoate | 21 |
| 44 | Phenylmercuric trifluoroacetate (1.95) (5.0) | CH$_3$OH (20) | Palladium dichloride (0.009) (0.050) Triisopropylphosphite (0.020) (0.10) | 500 | ½ | 75 | methyl benzoate | 60 |
| 45 | Phenylmercuric acetate (16.8) (50) | CH$_3$OH (150) | Tetrakis(triphenylphosphine)-palladium (O) (0.115) (0.10) | 275 | 2.0 | 150 | Methyl benzoate | 50 |
| 46 | Phenylmercuricacetate (16.8) (50) | CH$_3$OH (150) | Tetrakis(triphenylphosphine)-platinum (O) (0.125) (0.10) | 280 | 2.0 | 15 | Methyl benzoate | 34 |
| 47 | Phenylmercuric trifluoroacetate (15.6) (40) | CH$_3$OH (150) | Tris(triphenylphosphine)-chlororhodium (I) (0.095) (0.10) | 110 | 0.4 | 85 | Methyl benzoate | 56 |
| 48 | Phenylmercuricacetate (16.8) (50) | CH$_3$OH (150) | Bis(triphenylphosphine)-dichloroplatinum (0.080) (0.10) | 275 | 1.0 | 150 | Methyl benzoate | 35 |

TABLE IV-continued

| Example | Mercurial Feed (g.) (mmole) | Alcohol/ Solvent (ml.) | Catalyst (g.) (mmole) | Reaction Conditions CO Pressure psig | Time (hr.) | Temp. (°C) | Product(s) | Yield (%) |
|---|---|---|---|---|---|---|---|---|
| 49 | 1-Acetoxymercuri-2-methoxyhexane (5.61) (15.0) | CH₃OH (250) | Bis(triphenyl-phosphine)chloro-chlorocarbonyliridium (I) (0.10) (0.13) | 75 | 21 | 100 | Methylβ-methoxy heptanoate | 8 |

EXAMPLE 50

The palladium complex [(C₆H₅)₂P(CH₂)₈SiCl₃]₂PdCl₂ was prepared according to the teaching set forth in German Pat. No. 2,062,351, and reacted with dehydrated cab-o-sil to give an insoluble, supported palladium catalyst. Following the procedure of example 1, 0.04 mmole of this catalyst, 1.56 g. (4 mmoles) of phenylmercuric trifluoroacetate, 20 ml. of methanol, and 300 psig of carbon monoxide were charged to a 45 ml. Parr bomb and reacted at 75°C. for one-half hour to give a 24% yield of methyl benzoate based on starting mercurial. The catalyst was then filtered, washed with methanol and charged to a second reaction identical to the first. This gave 6% methyl benzoate. The catalyst from the second run was filtered, washed and charged to an identical third reaction which gave 5% methyl benzoate.

EXAMPLE 51

Graphite, palladium chloride, and chlorine were heated together to give a palladium chloride-impregnated graphite whose weight was unchanged by repeated washings with aqueous hydrogen chloride. Following the procedure of example 45, 0.04 mmole (based on palladium) of this material, 1.56 g. (4 mmoles) of phenylmercuric trifluoroacetate, 20 ml. of methanol and 200 psig of carbon monoxide were charged to a 45 ml. Parr bomb and reacted at 75°C. for 1 hour to give a 7% yield of methyl benzoate.

EXAMPLE 52

The sodium salt of Amberlyst 15 (Rohm & Haas Company's styrene-divinyl benzene copolymer based sulfonic acid cation exchange resin) was treated with equimolar aqueous palladium (II) chloride by shaking at room temperature. The treated resin was washed consecutively with water, acetic acid and finally methanol before drying at ambient temperature (150 mm.)

In a 500 ml. glass bomb were placed 1.0 g. of the above resin, 3.1 g. phenylmercuric trifluoroacetate, and 75 ml methanol. The bomb was pressured to 60 psig with carbon monoxide and then was shaken at 80°C. for 4 hrs. Gas chromatographic analysis of the cooled reaction mixture indicated a 25% yield of methyl benzoate.

EXAMPLE 53

Amberlyst 15 resin was treated with a 50% mole excess of aqueous palladium (II) chloride by shaking at room temperature. The resin was collected by filtration, washed first with water and then with methanol, and dried. The resin was added to a solution of triphenylphosphine in ethanol and slurried for 3 hrs. at room temperature. Again the resin was washed and dried.

In a 500 ml. glass bomb were placed 1.0 g. of the above resin, 3.1 g. phenylmercuric trifluoroacetate and 75 ml. methanol. Reactor contents were subjected to 60 psig carbon monoxide pressure, 90°C. heat, and shaking for 1.5 hr. Gas chromatographic analysis of the cooled reaction mixture indicated a 58% yield of methyl benzoate.

The resin-supported catalyst was separated from the reaction mixture and was added to a fresh charge of arylmercurial, alcohol and carbon monoxide as above. Heating at 90°C. with shaking for 1.5 hr. produced a 60% yield of ester.

EXAMPLES 54–62

Examples 54 to 62 (see Table V) demonstrate the variety of alcohols and acids which may be employed as part of the reaction shown in eq. 6. Generally, the method of example 13 was used for the alcohols whereas the method of example 1 was used for the acids.

TABLE V

| Example | Mercurial Feed (g) (mmole) | Alcohol or Acid/ Solvent (ml.) | Catalyst (g) (mmole) | Reaction Conditions CO Pressure psig | Time hr. | Temp.-°C | Product(s) | Yield (%) |
|---|---|---|---|---|---|---|---|---|
| 54 | Phenylmercuric trifluoroacetate (11.7) (30) | Ethyl Alcohol (200) | Bis(triphenylphosphine)-dichloropalladium (II) (0.10) (0.14) | 70 | 1.0 | 95 | Ethyl benzoate | 69 |
| 55 | Phenylmercuric trifluoroacetate (11.7) (30) | 2-Propanol (200) | Bis(triphenylphosphine)-dichloropalladium (II) (0.10) (0.14) | 70 | 1.0 | 95 | Isopropyl benzoate | 53 |
| 56 | Phenylmercuric trifluoroacetate (11.7) (30) | 1,2-Ethanediol (200) | Bis(triphenylphosphine)-dichloropalladim (II) (0.10) (0.14) | 70 | 1.0 | 110 | β-Hydroxyethyl benzoate | 70 |
| 57 | Phenylmercuric acetate (6.7) (20) | tert-butyl Alcohol (150) | Bis(triphenylphosphine)-dichloropalladium (II) (0.070) (0.10) | 100 | 1.0 | 75 | Benzoic Acid | 70 |
| 58 | Phenylmercuric acetate (6.7) (20) | Phenol (100) Tetrahydrofuran (50) | Bis(triphenylphosphine)-dichloropalladium (II) (0.070) (0.10) | 100 | 1.0 | 90 | Phenyl benzoate | 72 |
| 59 | Phenylmercuric acetate (6.7) (20) | 1-Octanol (150) | Bis(triphenylphosphine)-dichloropalladium (II) (0.070) (0.10) | 100 | 1.0 | 100 | Octyl benzoate | 99 |
| 60 | Phenylmercuric acetate (6.7) (20) | Allyl alcohol (150) | Bis(triphenylphosphine)-dichloropalladium (II) (0.070) (0.10) | 100 | 1.0 | 80 | Allyl benzoate | 55 |

TABLE V—Continued

| Example | Mercurial Feed (g) (mmole) | Alcohol or Acid/ Solvent (ml.) | Catalyst (g) (mmole) | Reaction Conditions CO Pressure psig | Time hr. | Temp.- °C | Product(s) | Yield (%) |
|---|---|---|---|---|---|---|---|---|
| 61 | Phenylmercuric acetate (1.35) (4.0) | Acetic Acid (20) | Bis(triphenylphosphine)- dichloropalladium (II) (0.028) (0.04) | 300 | 0.5 | 75 | Benzoic Acid | 53 |
| 62 | Phenylmercuric acetate (1.56) (4.0) | Trifluoroacetic acid (20) | Bis(triphenylphosphine)- dichloropalladium (II) (0.028) (0.04) | 300 | 0.5 | 75 | Benzoic Acid | 35 |

What is claimed is:

1. A method for preparing nonheterocyclic carboxylic acid esters, said method comprising the steps of reacting an organo mercury compound of the formula R—HgQ wherein R is one selected from the group consisting of $C_1$–$C_{30}$ linear, branched and cyclic alkyls, alkenyls, and alkynyls; and $C_6$–$C_{18}$ aryls and bears one or more substituents located at any position on the carbon skeleton, which substituents are selected from the group consisting of halide, hydroxide, carboxylate, carboxyl, carboalkoxyl, cyano, amino, acylamino, alkylamino, arylamino, nitro, sulfonate, carbonyl aryl, alkoxyl, aryloxyl, acyl, aroyl, nitrate, hydrosulfide, alkylsulfide, arylsulfide, and azide, and Q is an anion selected from the group consisting of chloride, bromide, iodide, perchlorate, nitrate, sulfate, bisulfate, hydroxide, alkoxide, aryloxide, acetate, propionate, butyrate, pivalate, neohexanoate, benzoate, chloroacetate, trichloroacetate, trifluoroacetate, methyl sulfonate, phenyl sulfonate, trifluoromethyl sulfonate with carbon monoxide and an alcohol in the presence of a catalyst, said catalyst being characterized by one of the following formulae:

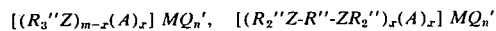

$[(R_3''Z)_{m-x}(A)_x] MQ_n'$,   $[(R_2''Z-R''-ZR_2'')_{x}(A)_x] MQ_n'$

I   II wherein R'' can be the same or different and each are ones selected from the group consisting of $C_1$–$C_{12}$ linear and branched hydrocarbyl; $C_3$–$C_{12}$ cyclic alkyls, $C_2$–$C_{12}$ alkenyls; $C_2$–$C_{12}$ alkynyls; $C_1$–$C_{12}$ alkoxy; $C_6$–$C_{18}$ aryloxy and $C_6$–$C_{18}$ aryl; said R'' groups can be substituted with halides, hydroxides, carboxylate, carboxyl, carboalkoxyl, cyano, amino, acylamino, $C_1$–$C_6$ alkylamino, nitro, sulfonate, $C_6$–$C_{10}$ arylamino, carbonyl, $C_6$–$C_{10}$ aryl, $C_1$–$C_{12}$ alkoxyl, $C_6$–$C_{10}$ aryloxyl, acyl and aroyl; Z is either a metal or metal oxide and is one selected from the group consisting of phosphorus, arsenic, antimony and the pentavalent oxide of each; A is selected from the group consisting of carbonyl, nitrile, isonitrile, and amine; M is a Group VIII metal; Q' is an anion; m is an integer ranging from 0 to 4; x is an integer ranging from 0 to 3; n is an integer ranging from 0 to 4; and the values of m and n are determined by the oxidation state of the Group VIII metal.

2. A method according to claim 1 wherein said organo mercury compound is one selected from the group consisting of vinylmercuric acetate, trifluoroacetoxymercuricarbomethoxybenzene, 4,4'-bis(-trifluoroacetoxymercuri)biphenyl, trifluoroacetoxymercuri-p-xylene, acetoxymercuri aniline, acetoxymercuri pseudocumene, acetoxymercuri polystyrene, trifluoroacetoxymercuri dimethyl terephthalate, 2,3-bis(acetoxymercuri)naphthalene, 4-(acetoxymercuri)-1,2-dimethyl benzene, 4-(acetoxymercuri)-1,3-dimethyl benzene, 4,5-bis(acetoxymercuri)-1,2-dimethyl benzene, 4,6-bis(trifluoroacetoxymercuri)-1,3-dimethyl benzene.

3. A method according to claim 1 wherein the alcohol is represented by $R'(OH)_{n'}$ wherein R' is one selected from the group consisting of primary, secondary and tertiary $C_1$–$C_{30}$ aliphatic and cycloaliphatic, $C_3$–$C_{20}$ alkenyl, $C_3$–$C_{20}$ alkynyl, $C_6$–$C_{20}$ hydroxy substituted aromatic and $n'$ ranges from 1 to 6.

4. A method according to claim 1 wherein the partial pressure of carbon monoxide ranges from 0.01 to 1000 atmospheres.

5. A method according to claim 1 wherein the temperature ranges from 0° to 500°C. and the pressure ranges from 1 to 1000.

6. A method according to claim 1 wherein the alcohol is present in an amount ranging from 1 to 1000 moles of alcohol per mole of CO mercurial compound.

7. A method according to claim 2 wherein a cosolvent is employed.

8. A method according to claim 5 wherein said cosolvent is one selected from the group consisting of $C_5$–$C_{20}$ alkanes; $C_6$–$C_{12}$ aromatic hydrocarbons; halocarbons; esters; nitro compounds; nitriles; carbonates; sulfoxides and sulfones.

9. A method according to claim 8 wherein the amount of cosolvent ranges from 1 to 500 volume per cent relative to the amount of alcohol present.

10. A method according to claim 1 further including the step of recycling the metallic mercury produced as a byproduct in said method.

11. A method for preparing nonheterocyclic carboxylic acids, said method comprising the steps of reacting an organo mercury compound of the formula R—HgQ wherein R is one selected from the group consisting of $C_1$–$C_{30}$ linear, branched and cyclic alkyls, alkenyls, and alkynyls; and $C_6$–$C_{18}$ aryls and bears one or more substituents located at any position in the carbon skeleton which substituents are selected from the group consisting of halide, hydroxide, carboxylate, carboxyl, carboalkoxyl, cyano, amino, acylamino, alkylamino, arylamino, nitro, sulfonate, carbonyl, aryl alkoxyl, aryloxyl, acyl, aroyl, nitrate, hydrosulfide, alkylsulfide, arylsulfide, and azide; and Q is an anion selected from the group consisting of chloride, bromide, iodide, perchlorate, nitrate, sulfate, bisulfate, hydroxide, alkoxide, aryloxide, acetate, propionate, butyrate, pivalate, neohexanoate, benzoate, chloroacetate, trichloroacetate, trifluoroacetate, methyl sulfonate, phenylsulfonate, trifluoromethyl sulfonate with carbon monoxide and an alcohol in the presence of a catalyst, said catalyst being characterized by one of the following formulae:

$[(R_3''Z)_{m-x}(A)_x] MQ_n'$,   $[(R_2''Z-R''-ZR_2'')_{m-x}(A)_x] MQ_n'$

I   II wherein R'' can be the same or different and each are ones selected from the group consisting of $C_1$–$C_{12}$ linear and branched hydrocarbyl; $C_3$–$C_{12}$ cyclic alkyls, $C_2$–$C_{12}$ alkenyls; $C_2$–$C_{12}$ alkynyls; $C_1$–$C_{12}$ alkoxy; $C_6$–$C_{18}$ aryloxy and $C_6$–$C_{18}$ aryl; said R'' groups can be substituted with halides, hydroxides, carboxylate, carboxyl, carboalkoxyl, cyano, amino, acylamino, $C_1$–$C_6$ alkylamino, nitro, sulfonate, $C_6$–$C_{10}$ arylamino, carbonyl, $C_6$–$C_{10}$ aryl, $C_1$–$C_{12}$ alkoxyl, $C_6$–$C_{10}$ aryloxyl, acyl and aroyl; Z is either a metal or metal oxide and is one selected from the group consisting of phosphorus, arsenic, antimony and the pentavalent oxide of each; A is selected from the group consisting of carbonyl, nitrile, isonitrile, and amine; M is a Group VIII metal; Q' is an anion; $m$ is an integer ranging from 0 to 4; $x$ is an integer ranging from 0 to 3; $n$ is an integer ranging from 0 to 4; and the values of m and n are determined by the oxidation state of the Group VIII metal.

12. A method according to claim 11 wherein said carboxylic acid is a $C_2$–$C_{10}$ low molecular weight acid.

13. A method according to claim 11 further including the step of recycling the metallic mercury produced as a byproduct in said method.

* * * * *